US008879803B2

(12) United States Patent
Ukil et al.

(10) Patent No.: US 8,879,803 B2
(45) Date of Patent: Nov. 4, 2014

(54) METHOD, APPARATUS, AND COMPUTER PROGRAM PRODUCT FOR IMAGE CLUSTERING

(75) Inventors: Soumik Ukil, Bangalore (IN); Basavaraj SV, Bangalore (IN); Pranav Mishra, Bangalore (IN)

(73) Assignee: Nokia Corporation, Espoo (FI)

( * ) Notice: Subject to any disclaimer, the term of this patent is extended or adjusted under 35 U.S.C. 154(b) by 418 days.

(21) Appl. No.: 13/326,255

(22) Filed: Dec. 14, 2011

(65) Prior Publication Data

US 2012/0321193 A1 Dec. 20, 2012

(30) Foreign Application Priority Data

Dec. 30, 2010 (IN) .............. 4021/CHE/2010

(51) Int. Cl.
G06K 9/62 (2006.01)
G06F 17/30 (2006.01)
G06K 9/00 (2006.01)

(52) U.S. Cl.
CPC ...... *G06K 17/30256* (2013.01); *G06F 17/3028* (2013.01); *G06K 9/00288* (2013.01); *G06K 9/6219* (2013.01)
USPC .......................................... 382/118; 382/225

(58) Field of Classification Search
None
See application file for complete search history.

(56) References Cited

U.S. PATENT DOCUMENTS

| 6,285,995 B1 | 9/2001 | Abdel-Mottaleb et al. |
| 7,756,334 B2 | 7/2010 | Kim et al. |
| 2003/0123737 A1* | 7/2003 | Mojsilovic et al. ........... 382/224 |
| 2008/0089561 A1 | 4/2008 | Zhang |
| 2008/0298766 A1 | 12/2008 | Wen et al. |
| 2010/0226584 A1 | 9/2010 | Weng et al. |
| 2012/0096359 A1* | 4/2012 | Denney et al. ................ 715/730 |

FOREIGN PATENT DOCUMENTS

WO 2010/021625 A1 2/2010

OTHER PUBLICATIONS

Chu et al., "Visual Language Model for Face Clustering in Consumer Photos", Proceedings of the 17th ACM international conference on Multimedia, 2009, pp. 625-628.
Gu et al., "Clustering Consumer Photos Based on Face Recognition", IEEE International Conference on Multimedia and Expo, Jul. 2-5, 2007, pp. 1998-2001.
Holub et al., "Unsupervised Clustering for Google Searches of Celebrity Images", 8th IEEE International Conference on Automatic Face & Gesture Recognition, Sep. 17-19, 2008, 8 pages.
International Search report and Written Opinion, received in corresponding Patent Cooperation Treaty Application No. PCT/FI2011/050979, dated Feb. 28, 2012, 13 pages.

(Continued)

*Primary Examiner* — Brian P Werner
(74) *Attorney, Agent, or Firm* — Harrington & Smith

(57) ABSTRACT

Various methods for clustering images of faces are provided. One example method may include receiving a plurality of input clusters including a first cluster and at least a second cluster, where each input cluster including at least one feature that was extracted from an image. The example method may further include determining a first medoid for the first cluster and a second medoid for the second cluster, determining an inter-cluster distance between the first medoid and the second medoid, and merging the first cluster with the second cluster to generate a merged cluster in an instance in which the inter-cluster distance is less than a distance threshold. Similar and related example methods, example apparatuses, and example computer program products are also provided.

23 Claims, 6 Drawing Sheets

(56) References Cited

OTHER PUBLICATIONS

Dahl, A.B., "Effective Database Search Via Dimensionality Reduction", Computer Vision and Pattern Recognition Workshop, Jun. 23-28, 2008, 6 pages.

Barbu, Eugen, "Clustering Document Images using a Bag of Symbols Representation", International Conference on Document Analysis and Recognition (ICDAR'05), Sep. 1, 2005, pp. 1216-1220.

* cited by examiner

US 8,879,803 B2

METHOD, APPARATUS, AND COMPUTER PROGRAM PRODUCT FOR IMAGE CLUSTERING

RELATED APPLICATIONS

This application claims priority benefit to Indian Patent Application No. 4021/CHE/2010, filed Dec. 30, 2010 and is hereby incorporated by reference in its entirety.

TECHNICAL FIELD

Various embodiments relate generally to image processing, and, more particularly, relate to a method, apparatus, and computer program product for clustering image faces.

BACKGROUND

As digital photography technology continues to evolve and be incorporated into devices such as mobile phones, users inevitably are leveraging this technology to capture more images and video. Additionally, social networking websites have also contributed to this digital image revolution by providing increasingly simply ways to share images, in some instances, in near real time. As users continue to capture and collect increasing numbers of images, the ability to organize and manage these images can become cumbersome and inefficient. For example, attempting to find images of a particular individual within a collection of images may require a user to individually view each image in a collection to obtain a group of images that include the desired person. This process can be time consuming and tedious.

SUMMARY

Example methods, example apparatuses, and example computer program products are described herein that provide for clustering images of faces. One example method may include receiving a plurality of input clusters including a first cluster and at least a second cluster. In this regard, each input cluster may include at least one feature where each feature is extracted from a facial image. Further, each cluster may include a medoid. The medoid of a given cluster may be a particular feature of the given cluster that, relative to distances between each of the features within the given cluster, is closest to the most distant feature from that particular feature. The example method may further comprise determining a first medoid for the first cluster and a second medoid for the second cluster, determining an inter-cluster distance between the first medoid and the second medoid, and merging the first cluster with the second cluster to generate a merged cluster in an instance in which the inter-cluster distance is less than a distance threshold.

An additional example embodiment is an apparatus configured to implement graphical authentication. The example apparatus may comprise at least one processor and at least one memory including computer program code, the at least one memory and the computer program code configured to, with the at least one processor, direct the apparatus to perform various functionality. In this regard, the example apparatus may be directed to receive a plurality of input clusters including a first cluster and at least a second cluster. In this regard, each input cluster may include at least one feature where each feature is extracted from an image. Further, each cluster may include a medoid. The medoid of a given cluster may be a particular feature of the given cluster that, relative to distances between each of the features within the given cluster, is closest to the most distant feature from that particular feature. The example apparatus may be further directed to determine a first medoid for the first cluster and a second medoid for the second cluster, determine an inter-cluster distance between the first medoid and the second medoid, and merge the first cluster with the second cluster to generate a merged cluster in an instance in which the inter-cluster distance is less than a distance threshold.

Another example embodiment is a computer program that, when executed causes an apparatus to receive a plurality of input clusters including a first cluster and at least a second cluster. In this regard, each input cluster may include at least one feature where each feature is extracted from an image. Further, each cluster may include a medoid. The medoid of a given cluster may be a particular feature of the given cluster that, relative to distances between each of the features within the given cluster, is closest to the most distant feature from that particular feature. The example computer program may be further configured to cause the apparatus to determine a first medoid for the first cluster and a second medoid for the second cluster, determine an inter-cluster distance between the first medoid and the second medoid, and merge the first cluster with the second cluster to generate a merged cluster in an instance in which the inter-cluster distance is less than a distance threshold.

Another example embodiment is a computer program product comprising at least one computer readable medium having computer program code stored thereon, wherein the computer program code, when executed by an apparatus (e.g., one or more processors), causes an apparatus to perform various functionalities. In this regard, the program code may cause the apparatus to receive a plurality of input clusters including a first cluster and at least a second cluster. In this regard, each input cluster may include at least one feature where each feature is extracted from an image. Further, each cluster may include a medoid. The medoid of a given cluster may be a particular feature of the given cluster that, relative to distances between each of the features within the given cluster, is closest to the most distant feature from that particular feature. The example computer program code may further cause the apparatus to determine a first medoid for the first cluster and a second medoid for the second cluster, determine an inter-cluster distance between the first medoid and the second medoid, and merge the first cluster with the second cluster to generate a merged cluster in an instance in which the inter-cluster distance is less than a distance threshold.

Another example apparatus comprises means for receiving a plurality of input clusters including a first cluster and at least a second cluster. In this regard, each input cluster may include at least one feature where each feature is extracted from an image. Further, each cluster may include a medoid. The medoid of a given cluster may be a particular feature of the given cluster that, relative to distances between each of the features within the given cluster, is closest to the most distant feature from that particular feature. The example apparatus may further comprise means for determining a first medoid for the first cluster and a second medoid for the second cluster, means for determining an inter-cluster distance between the first medoid and the second medoid, and means for merging the first cluster with the second cluster to generate a merged cluster in an instance in which the inter-cluster distance is less than a distance threshold.

BRIEF DESCRIPTION OF THE DRAWINGS

Figure 1:
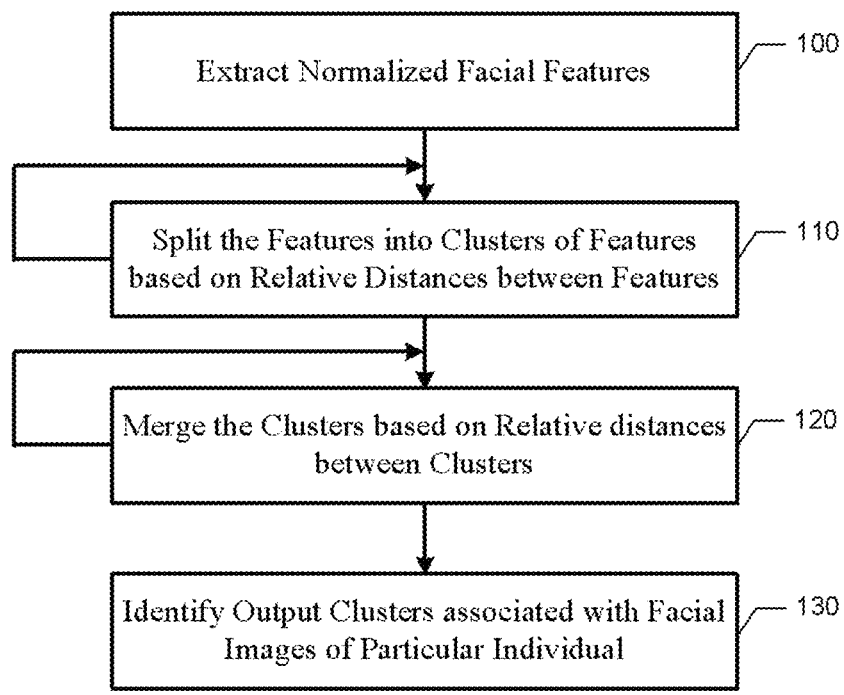
Figure 2:
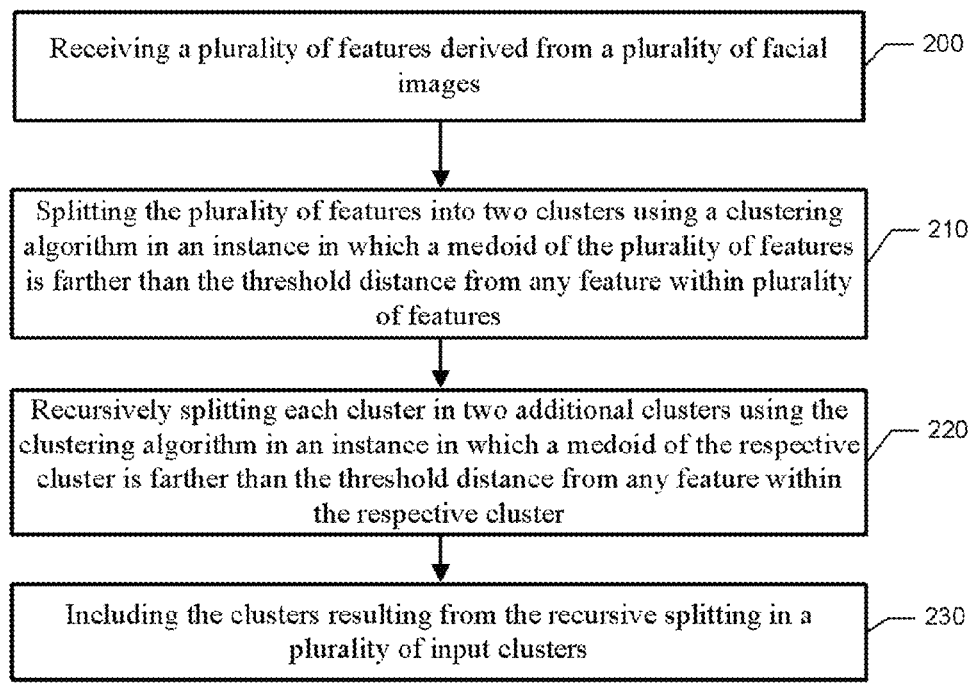
Figure 3:
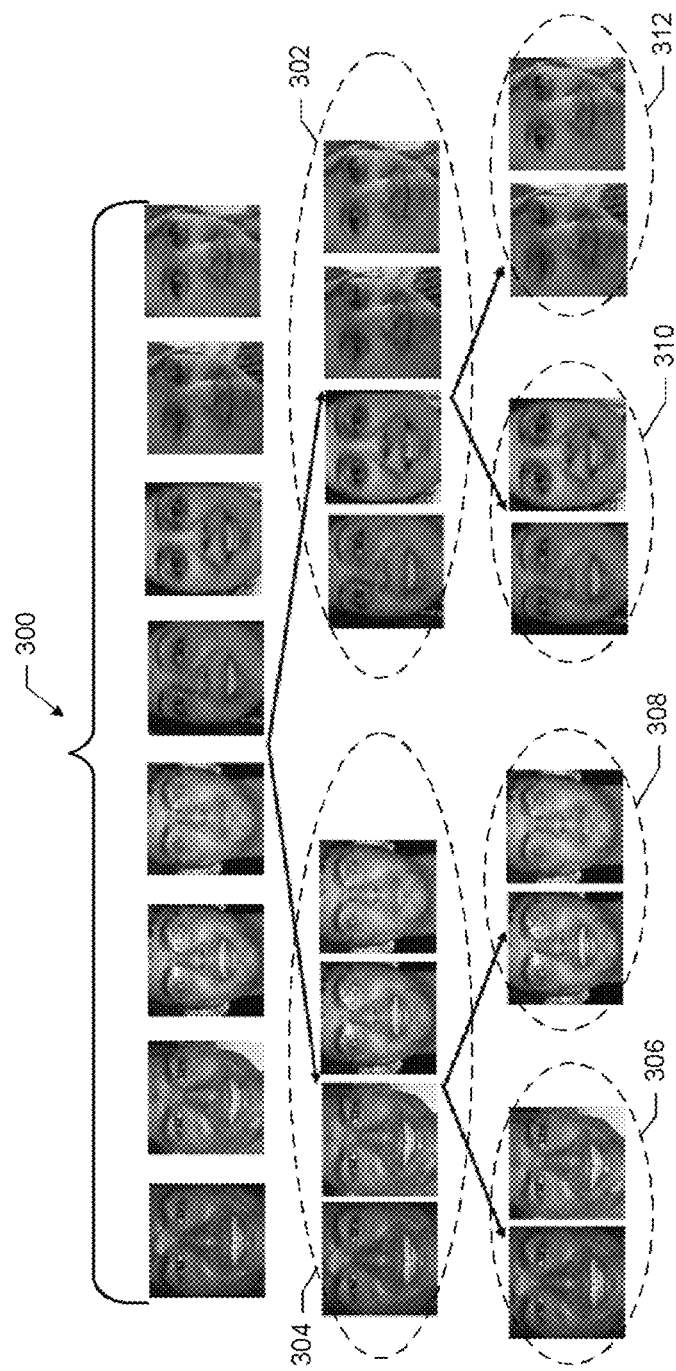
Figure 4:
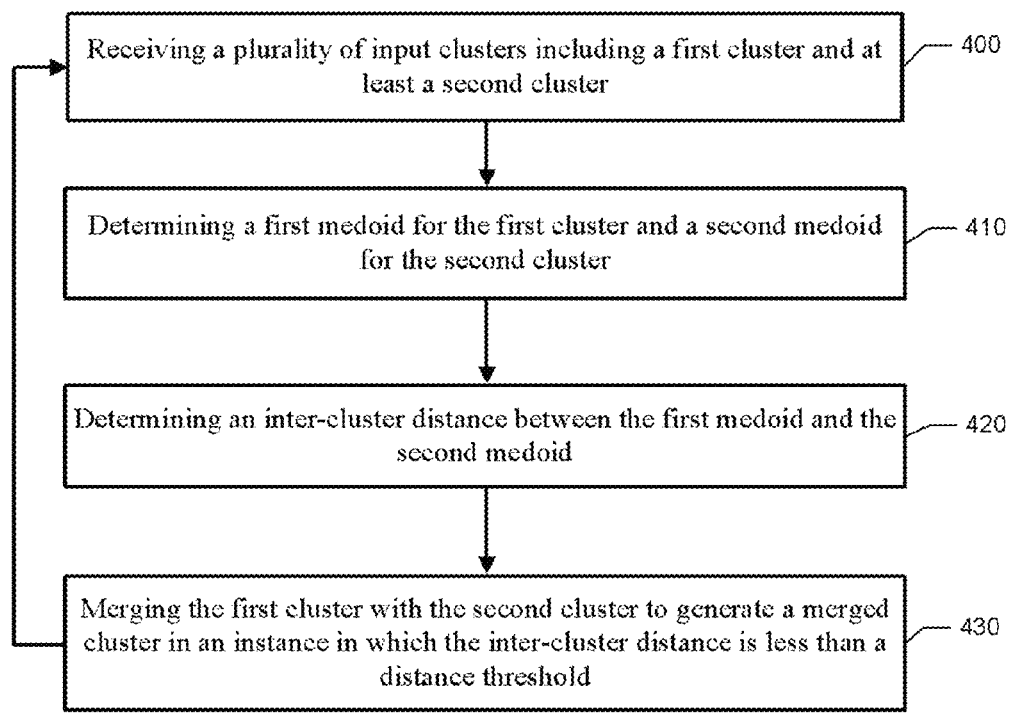
Figure 5:
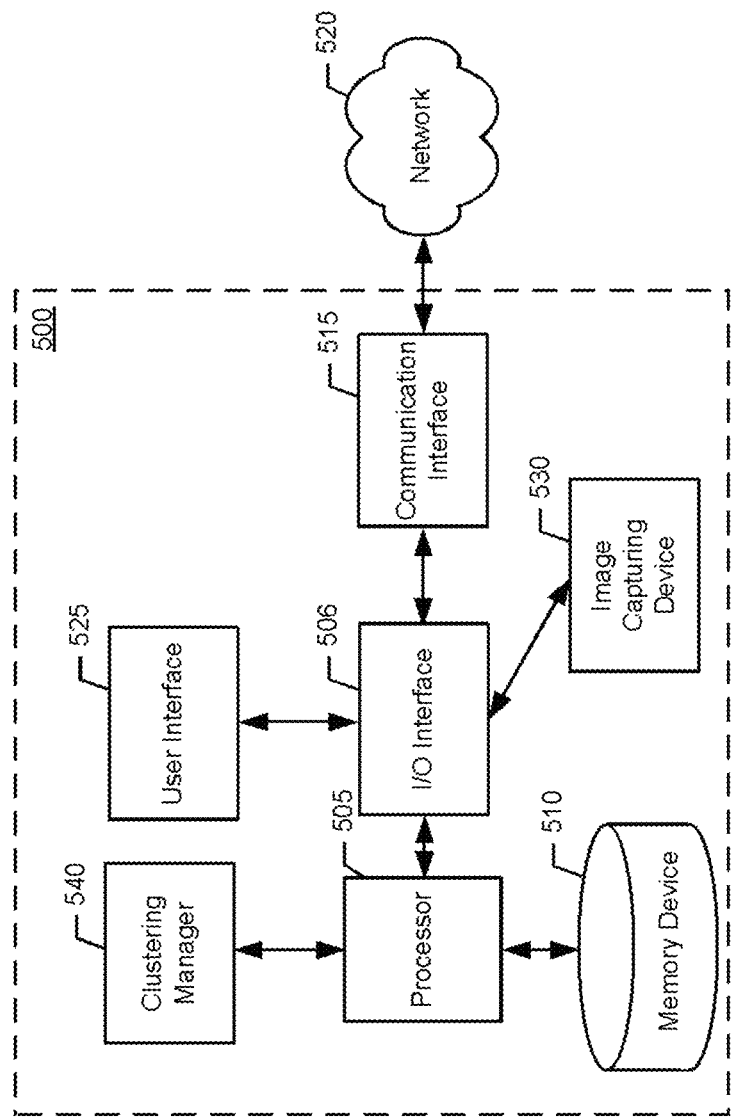
Figure 6:
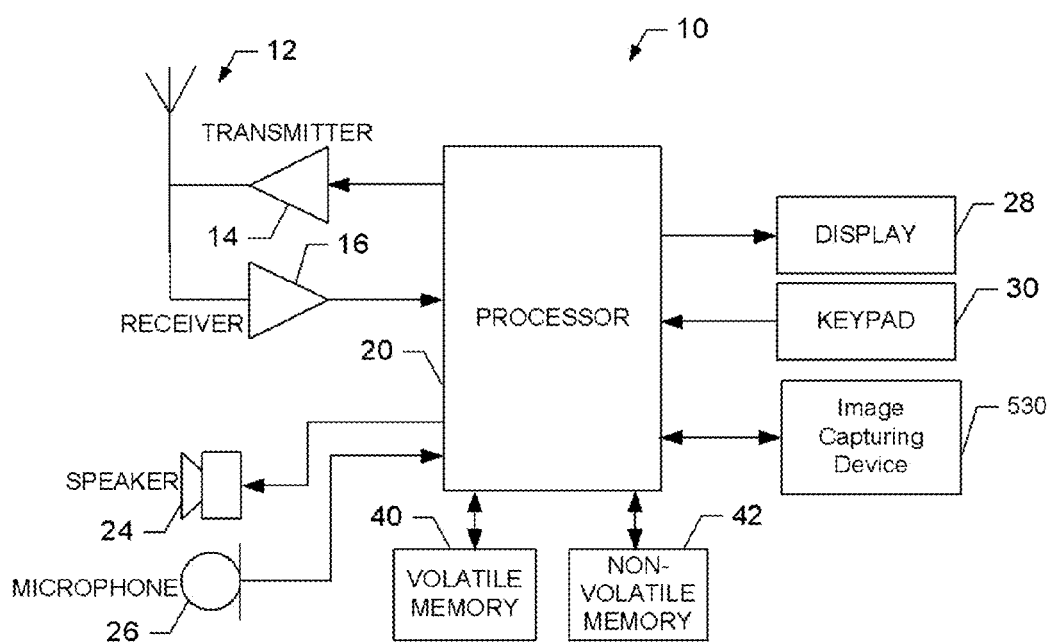

Having thus described some example embodiments in general terms, reference will now be made to the accompanying drawings, which are not necessarily drawn to scale, and wherein:

FIG. 1 illustrates an example flowchart for clustering images according to an example embodiment;

FIG. 2 illustrates an example flowchart for clustering features through splitting according to an example embodiment;

FIG. 3 illustrates and example splitting scenario according to various example embodiments;

FIG. 4 illustrates an example flowchart for merging clusters according to an example embodiment;

FIG. 5 illustrates a block diagram of an apparatus and associated system for implementing facial image clustering according to some example embodiments; and FIG. 6 illustrates a block diagram of a mobile terminal configured to implement facial image clustering according to some example embodiments.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Various example embodiments operate to cluster (or group) facial images such that each cluster includes facial images of the same individual. As such, some example embodiments may be implemented on any device configured to perform image processing, including a device that has a built-in camera or image capturing module capable of capturing images and video. For example, such a device may be a mobile phone equipped with CMOS/CCD (complementary metal-oxide semiconductor/charged coupled device) sensors, a digital still camera, a camcorder, or the like. Further, according to some example embodiments, the devices for implementing facial image clustering may be media storage devices, online services, photo album programs implemented on a computer, or the like.

According to various example embodiments, multiple images of different people within a collection of images, such as a photo album may be automatically tagged and/or labeled, for example, with a name of the person or persons appearing in a photo. To do so, example embodiments may automatically group faces belonging to the same person using, for example, face coordinates that may be provided by a face detector, the location of the eyes provided by an eye locator, a mechanism for normalizing the faces, and a mechanism to extract features from the faces. As such, the position of the right and left eye may be detected and an eye-to-eye distance may be determined and used for normalizing. The extracted features may then be analyzed and, based on the analyses, groupings of features may be formed. Those groupings, or clusters, may be further refined by merging clusters that meet particular criteria. As such, using the techniques described herein, some example embodiments can achieve a very high true clustering rate, at low computational cost, by grouping similar features based on distances to the center-most element (or medoid) of the clusters. According to some example embodiments, the technique can be extremely efficient compared to, for example, manually tagging images belonging to a person and finding the similar faces, or using traditional face recognition based approaches.

FIG. 1 illustrates a generalized flowchart of some example embodiments. In this regard, based on a collection of images, facial features may be extracted and normalized at 100. Inputs used to generate the extracted and normalized facial features may include the outputs of a face detector, which may include face coordinates, and coordinates of the left and right eyes. Using these inputs, face normalization and feature extraction may be performed.

In this regard, locations of the left and right eyes may be used to normalize the faces, such that the faces are upright and cropped based on the distance between the eyes. Based on these normalized faces, histogram features based on local binary patterns of different gradient images may be extracted. According to some example embodiments, each feature may be a concatenation of the image feature and a feature from the image mirrored about an axis through the feature's center (e.g., mirrored about the Y axis through the feature's center). The extracted features may be normalized such that each feature is a unit vector.

Having extracted and normalized the features, the features may then be split into groups or clusters. As such, at 110, the features may be split into clusters based on relative distances between the features. The splitting may continue in a recursive fashion (as indicated by the arrow from operation 110 back to the input of 110) until convergence is achieved for all clusters of features relative to a distance threshold. To consider relative distances, the distances between pairs of features that have been generated may be calculated. In this regard, for every feature pair (A,B), a distance metric $D(A,B)$ may be computed. In some example embodiments, the distance metric may be based on subspaces $(A,A')$ and $(B,B')$, where $A'$ and $B'$ are features corresponding to mirror images of A and B, respectively.

As indicated above, starting with the entire set of features, according to various example embodiments, the set may be split into two clusters in response to a determination with respect to the distance threshold. The splitting operation may be continued with each new cluster in a recursive fashion. To perform the splitting, any clustering method may be used, including, but not limited to, k-means, k-medoids, graph-cuts, and Gaussian mixture models. The splitting may recursively continue until an analysis of each cluster indicated that the cluster satisfies the stopping criterion.

To determine whether or not to split a cluster of features, a central element of the cluster may be identified. The central element may be called the medoid of the cluster. The medoid may be the feature for which the distance to its farthest neighbor is minimum amongst all elements of the cluster. In an alternative definition, the medoid may also be the feature of a cluster that has the lowest average distance to the other features within the cluster. To determine whether a split is to be performed, the distance from the medoid to the feature within the cluster that is farthest from the medoid (also referred to as the min-max distance), may be compared to a threshold distance. If the min-max distance is greater than the threshold distance, then a split may be performed. If the min-max distance is less than the threshold distance, then no further splitting is needed for that cluster because the stopping criterion for the cluster has been met.

In an embodiment, the threshold distance may be an attribute that is set in any of a number of ways. For example, the threshold distance may be input as a user preference by the user via a user interface. Additionally, or alternatively, the threshold distance may be set during a manufacturing process. Additionally, or alternatively, the threshold distance may be calculated based on a user's preferences as indicted by the user's actions captured by the device, without requiring the express inputting of a value for the threshold distance by the user. By modifying the threshold distance, different degrees of clustering may be performed. In this regard, a shorter threshold distance may result in an increased granularity of clustering, with a cost of increased processing. On the other hand, a longer threshold distance may tend to reduce granularity and avoid the creation of unnecessary clusters that can result from too much splitting.

Subsequent to splitting the features into clusters at 110, the clusters may be analyzed again to determine if merging of clusters is needed. As such, at 120, clusters may be merged based on relative distance between the clusters. Similar to splitting, the process of merging clusters may be performed in a repetitive fashion (as indicated by the arrow from operation 120 back to the input of 120) until a stopping criterion is satisfied for each cluster.

Accordingly, after the clusters are created in 110, the medoid of each cluster may again be utilized. The distances between the medoids of each cluster may then be determined, where the distance may be calculated in the same manner as indicated above using the distances between subspaces. As such, the distances between the cluster pairs may be determined, and using, for example, the same clustering algorithm as used for splitting, merging of the clusters may be performed. The merging of clusters may be continued until all clusters satisfy the stopping criterion.

In this regard, to determine whether to merge two clusters, the distances between the clusters based on the medoids of the clusters may be compared to the threshold distance. This threshold distance may be same distance as described above with respect to the splitting. If the distance between clusters (or cluster medoids) is less than the distance threshold, the clusters are said to be "connected" and the clusters may be merged. A collection of connected clusters may be referred to as a clique. On the other hand, if the distance between clusters (or cluster medoids) is greater than the distance threshold, then clusters are sufficiently distinct and need not be merged. As indicated above, the analysis of the medoid-to-medoid distances may be performed in a repetitive fashion, until an iteration of the process where the number of remaining clusters is left unchanged.

According to various example embodiments, upon completion of the merging process at 120, the output clusters may be identified at 130. In this regard, the output clusters may be associated with a particular individual, and, for example, the associated images may be tagged based on the clusters.

However, according to some example embodiments, prior to associating the merged clusters from operation 120 with a particular individual, some additional processing and merging may be undertaken. In this regard, after the multi-pass merging of clusters is complete at 120, additional operations may be performed. For example, for faces which are not in any cluster, a distance metric may be calculated from that face to the existing clusters. If the calculated distance is less than a merge threshold, which may be the same as the distance threshold, the singular face may be merged into the existing cluster. Again, this distance measure may be based on a projection of the face onto a subspace formed by taking a subset of the vectors in a cluster, similar to distance measurement described above and otherwise provided herein. Additionally, for all existing clusters, the distance between the subspaces defined by pairs of clusters may be determined, and if this distance is less than a threshold (e.g., the threshold distance), the clusters may be merged. Upon completion of these additional merging operations, the output clusters may be identified and associated with an individual at 130.

Accordingly, various example embodiments may perform the multi-pass processing described in FIG. 1, and otherwise herein, to cluster faces, based on hierarchical splitting into two clusters at each recursive operation. Further, according to some example embodiments, a particular distance metric calculation may be leveraged for use between image features and between clusters for splitting and merging, respectively. Additionally, a single distance threshold may be utilized for some or all operations of the multi-pass algorithm. Some example embodiments also avoid the need to explicitly determine cluster centers prior to the process and the process can automatically estimate the number of clusters and cluster centers as needed during the execution. Further, according to some example embodiments, a flexible clustering framework may be provided that may utilize any clustering algorithm to perform recursive splitting into two clusters.

Having described some example embodiments in general terms with respect to FIG. 1, the following provides a description of additional details and/or alternatives based on the content of FIGS. 2-4. The content of FIG. 2 and the associated description below provides additional detail and alternatives to the operation of splitting the features into clusters at 110. FIG. 3 illustrates an example splitting process as provided herein. Finally, the content of FIG. 4 and the associated description below provides additional detail and alternatives to the operation of merging the clusters into clusters at 120.

Referring now to FIG. 2, an example process for receiving and splitting extracted features into clusters is provided. In this regard, the process may begin with receiving a plurality of features derived from a plurality of facial images at 200. The received features may be extracted by a number of different techniques that, for example, rely on face detection and the outputs often provided by face detection. For example, a given face detection technique may provide face coordinates, eye coordinates, and a face normalization and feature extraction method which may be used as inputs.

In this regard, given a set of images containing multiple faces, a face detector may be utilized, according to various example embodiments, to detect faces within the images. For each detected face, the right and left eyes may be detected, and the faces may be normalized according to, for example, the distance between the eyes. Features may then be extracted from the normalized faces, and passed to the clustering algorithm for splitting the collection of features into clusters.

At 210, the plurality of features may be split into two clusters using a clustering algorithm. The splitting me be undertaken in an instance in which the medoid of the plurality of features is farther than a threshold distance from any feature within the plurality of features. To calculate the distances used to determine whether or not to split the plurality of features or a cluster, the following technique may be used. It is noteworthy that, according to various example embodiments, all distances calculated throughout a process of clustering facial images may be calculated as follows.

For each feature pair (A,B), a normalization technique may be used to orthogonalize vectors generated based on the pair of elements. For example, a Gram-Schimdt normalization may be used to orthogonalize vectors (A, A') and (B, B'), where A' and B' are the features corresponding to the mirror images of A and B, respectively. By performing this operation, subspaces (a, a') and (b, b') may be generated. The projection $P_1$ of A onto the subspace (b, b') may be defined as:

$$P_1 = \sqrt{(a \cdot b)^2 + (a \cdot b')^2}.$$

Similarly, the projection $P_2$ of B onto the subspace (a, a') may be defined as:

$$P_2 = \sqrt{(b \cdot a)^2 + (b \cdot a')^2}.$$

Using these projections, a distance D may be defined as, $$D(A,B) = 1 - (P_1 + P_2)/2.$$

According to the relations provided above, the distances between features may be considered to determine whether a given cluster needs to be split. In particular, the distance, based on the above, may be determined between a medoid for the cluster and the feature farthest form the medoid (the min-max distance), and this distance may be compared to the threshold distance. If the min-max distance is greater than the threshold distance, then the features may be split into two clusters using any clustering algorithm as indicated above. If the min-max distance is less than the threshold distance, then the features do not need to be spilt, and the process ends.

Assuming that the features are split into two clusters, at 220, a recursive splitting of each cluster is undertaken. In this regard, each cluster is recursively split into two clusters using a clustering algorithm in an instance in which a medoid of the respective cluster is farther than the threshold distance from any feature within the respective cluster. As such, the clusters may be continuously split until the min-max distance of all clusters are less than the threshold distance. The final clusters from the recursive splitting may be included as input clusters at 230 for the merging process as described with respect to FIG. 4.

FIG. 3 illustrates a splitting process pictorially. In this regard, the collection of features represented at 300 may be analyzed as described above and split into clusters 302 and 304. Through the recursive operation of the technique, the clusters 302 and 304 are analyzed and if the min-max distance for the cluster is greater than the threshold distance, the cluster 302 and 304 are further split into two additional clusters for each, thereby forming clusters 306, 308, 310, and 312. In turn, these clusters may be considered for further splitting, but, as indicated in FIG. 3, the min-max distance of each is less than the threshold distance, and therefore no further splitting occurs with respect to these clusters. Accordingly, the operations of FIG. 2 may amount to a hierarchical algorithm which recursively splits a set of features into two clusters. The threshold distance used for the analysis, which may be input by the user, may determine the nature of the clusters formed. Further, any clustering algorithm may be to perform the splitting, such as, for example, the k-means algorithm, which can provide low computational complexity and a small memory footprint.

Referring now to FIG. 4, an example process for merging the input clusters is provided. In this regard, at 400, a plurality of input clusters may be received, as provided, for example, from the example process described with respect to FIG. 2. The clusters may include a first cluster and at least a second cluster.

At 410, medoids for each cluster, including the first and second cluster, are determined. Using the medoids, inter-cluster distances may be determined at 420. To determine the inter-cluster distance, the identity of the feature that is most distant from the medoid is identified. According to some example embodiments, to identify the feature that is most distant, the Euclidean distance between features may be used as the distance metric. Further, to determine the distance between a cluster pair (A,B), the distance D(A,B) may be calculated as the subspaces corresponding to ($A_{medoid}$, $A_{maximum}$) and ($B_{medoid}$, $B_{maximum}$), and the distance between the subspaces may calculated as described above. The subscripts correspond to the medoid and maximum distance element of the cluster from the medoid. Alternatively, if either A or B includes only one feature, then the distance between the clusters may be the distance between the medoids of the pair of clusters being considered, which may be compared to the threshold distance to facilitate determining whether the cluster should be merged or not.

At 430, the clusters, such as the first cluster and the second cluster, may be merged to generate a merged cluster in an instance in which the inter-cluster distance is less than the distance threshold. In this regard, the distances between clusters may be calculated as described above, and all pairs of clusters that have a distance less than the threshold distance may be merged. In some example embodiments, the clusters are merged only if the clusters to be merged form a clique, where a clique may be a set where all pairs of members have a distance less than the distance threshold. As indicated by the arrow from operation 430 to 400, the merging may be performed repeatedly until the number of clusters between successive iterations does not change and then the process is exited.

Additionally, other merge operations may be performed after the iterative merging is complete. In this regard, for all individual features which are still not part of any clusters (also know as singletons), a distance metric between the singleton and the existing clusters may be determined. To calculate this distance metric, if A is a singleton and B is a cluster with more than one member, n features out of B (in any order) may be selected. The features ($B_1$, $B_2$, ... $B_n$) may then be orthogonalized, for example, using Gram-Schmidt normalization to form the subspace ($b_1$, $b_2$, ... $b_n$). Then, D(A,B) may be determined as $D(A,B) = 1 - \sqrt{\Sigma(a \cdot b_i)^2}$, where a is the normalized form of A. Therefore, each singleton may be merged to the cluster to which the singleton is the nearest according to the metric defined above, provided the distance is below a threshold distance.

Additionally, after the previous operations, instances of faces belonging to the same person appearing in multiple clusters may still exist. To solve this 'over-clustering' issue, existing clusters may be merged using a distance metric between non-singleton clusters (clusters with more than one element). In this regard, for the cluster pair (A,B), a maximum of m features out of A and B (in any order) may be selected, where the number of elements selected may be $n_1$ and $n_2$. The features ($A_1, A_2 \ldots A_{n1}$) may be orthogonalized using, for example, Gram-Schmidt normalization to form the subspace ($a_1, a_2 \ldots a_{n1}$). Similarly the subspace corresponding to B, ($b_1, b_2 \ldots b_{n2}$) may be constructed. Further, where m=min($n_1$, $n_2$), the distance D(A,B) may be calculated as $$D(A, B) = 1 - \sqrt{\sum \sum \frac{(a_i \cdot b_j)^2}{m}}.$$

Using this distance, cluster pairs that fall below a predefined merging threshold (e.g., the threshold distance) may be combined together.

The description provided above and generally herein illustrates example methods, example apparatuses, and example computer program products for clustering facial images. However, it is contemplated that some of the example embodiments may be utilize for group any type of image in to various different types of categories. Other types of images that may be used include images of building or landmarks, images of animals, medical images, landscape images, or the like. According to some example embodiments, the threshold distance may be set based upon what type of images are being grouped.

FIGS. 5 and 6 depict example apparatuses that may be configured to perform various functionalities as described herein, including those described with respect to operations described with respect to the descriptions of FIGS. 1-4 provided above, and with respect to the flowcharts of FIGS. 1, 3, and 4, and the operations otherwise described herein.

Referring now to FIG. 5, an example embodiment is depicted as apparatus 500. The mobile terminal 100 or the computer system 150 may be example embodiments of apparatus 500. In some example embodiments, the apparatus 500 need not include wireless communications functionality, but in other example embodiments, the apparatus 500 may, be embodied as, or included as a component of, a communications device with wired and/or wireless communications capabilities. In some example embodiments, the apparatus 500 may be part of a communications device, such as a stationary or a mobile communications terminal. As a mobile device, the apparatus 500 may be a mobile and/or wireless communications node such as, for example, a mobile and/or wireless server, computer, access point, handheld wireless device (e.g., telephone, portable digital assistant (PDA), mobile television, gaming device, camera, video recorder, audio/video player, radio, digital book reader, and/or a global positioning system (GPS) device), any other type of device that may require personal authentication (e.g., banking devices such automated teller machines (ATMs), doorway and personal access devices, vehicle control systems, and the like), any combination of the aforementioned, or the like. Regardless of the type of communications device, apparatus 500 may also include computing capabilities.

FIG. 5 illustrates a block diagram of example components of the apparatus 500. The example apparatus 500 comprises or is otherwise in communication with a processor 505, a memory device 510, an Input/Output (I/O) interface 506, a user interface 525, and a clustering manager 540. In some example embodiments, the apparatus 500 may further include a communications interface 515. The processor 505 may, according to some example embodiments, be embodied as various means for implementing the various functionalities of example embodiments including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes or directs the apparatus 500 to perform various functionalities described herein.

Whether configured as hardware or via instructions stored on a computer-readable storage medium, or by a combination thereof, the processor 505 may be an entity and means capable of performing operations according to embodiments while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server or mobile terminal) configured for employing example embodiments by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 comprises Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), various type of solid-state storage (e.g., flash memory), and/or the like. Memory device 510 may include a cache area for temporary storage of data. In this regard, some or all of memory device 510 may be included within the processor 505. In some example embodiments, the memory device 510 may be in communication with the processor 505 and/or other components via a shared bus. In some example embodiments, the memory device 510 may be configured to provide secure storage of data, such as, for example, the characteristics of the reference marks, in trusted modules of the memory device 510.

Further, the memory device 510 may be configured to store information, data, applications, computer-readable program code instructions, and/or the like for enabling the processor 505 and the example apparatus 500 to carry out various functions in accordance with example embodiments described herein. For example, the memory device 510 may be configured to buffer input data for processing by the processor 505.

Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the I/O interface may embody or be in communication with a bus that is shared by multiple components. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities.

In some embodiments, the apparatus 500 or some of the components of apparatus 500 (e.g., the processor 505 and the memory device 510) may be embodied as a chip or chip set. In other words, the apparatus 500 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 500 may therefore, in some cases, be configured to implement embodiments on a single chip or as a single "system on a chip." As such, in some cases, a chip or chipset may constitute means for performing the functionalities described herein and with respect to the processor 505.

The communication interface 515 may be any device or means embodied in hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as a communications protocol that supports cellular communications. According to various example embodiments, the communication interface 515 may be configured to support the transmission and reception of communications in a variety of networks including, but not limited to Internet Protocol-based networks (e.g., the Internet), cellular networks, or the like. Further, the communications interface 515 may be configured to support device-to-device communications. Processor 505 may also be configured to facilitate communications via the communications interface 515 by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The user interface 525 may be in communication with the processor 505 to receive user input via the user interface 525 and/or to present output to a user as, for example, audible, visual, mechanical, or other output indications. The user interface 525 may include, for example, a keyboard, a mouse, a joystick, a display (e.g., a touch screen display), a microphone, a speaker, camera, accelerometer, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 505, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs (e.g., user inputs for the threshold distance). The processor 505 may also comprise, or be in communication with, display circuitry configured to display at least a portion of a user interface, the display and the display circuitry configured to facilitate user control of at least some functions of the apparatus 500.

In addition to or in lieu of, some of the user input and out devices described above, the user interface 525 may include, as mentioned above, one or more touch screen displays. A touch screen display may be configured to visually present graphical information to a user, as well as receive user input via a touch sensitive screen. The touch screen display, which may be embodied as any known touch screen display, may also include a touch detection surface configured to enable touch recognition by any suitable technique, such as resistive, capacitive, infrared, strain gauge, surface wave, optical imaging, dispersive signal technology, acoustic pulse recognition, or other like techniques. In some example embodiments, the touch screen display may be configured to operate in a hovering mode, where movements of a finger, stylus, or other implement can be sensed if sufficiently near the touch screen surface, without physically touching the surface. The touch screen displays may include the hardware to detect a touch if contact is made with the touch detection surface and send an indication to, for example, processor 505 indicating characteristics of the touch such as location information. A touch event may occur if an object, such as a stylus, finger, pen, pencil or any other pointing device, comes into contact with a portion of the touch detection surface of the touch screen display in a manner sufficient to register as a touch. The touch screen display may therefore be configured to generate touch event location data indicating the location of the touch event on the screen. Additionally, in some example embodiments, the touch screen display may be configured to detect a touch and capture attributes of the touch for deriving characteristics of the plurality of authentication marks.

In some embodiments, the apparatus 500 may include an image capturing module 530, such as a camera, video and/or audio module, in communication with the processor 505. The image capturing module 530 may be any means for capturing images, video and/or audio for storage, display, or transmission. For example, in an exemplary embodiment in which the image capturing module 530 is a camera, the camera may be configured to form and save a digital image file from an image captured by the camera. The image capturing module 530 may include hardware such as a CMOS/CCD (complementary metal-oxide semiconductor/charged coupled device) sensors configured for capturing images. The image capturing module 530 may be configured to capture media items in accordance with a number of capture settings. The capture settings may include, for example, focal length, zoom level, lens type, aperture, shutter timing, white balance, color, style (e.g., black and white, sepia, or the like), picture quality (e.g., pixel count), flash, red-eye correction, date, time, or the like. In some embodiments, the values of the capture settings (e.g., degree of zoom) may be obtained at the time a media item is captured and stored in association with the captured media item in a memory device, such as, memory device 510.

The image capturing module 530 can include all hardware, such as circuitry, a lens or other optical component(s), and software for creating a digital image file from a captured image. The image capturing module 530 may also include all hardware, such as circuitry a lens or other optical component(s), and software to provide various image capturing functionality, such as, for example, image zooming functionality. Image zooming functionality can include the ability to magnify or de-magnify an image prior to or subsequent to capturing an image.

Alternatively, according to some example embodiments, the image capturing module 530 may include only the hardware needed to view an image, while a memory device, such as the memory device 510 of the apparatus 500 stores instructions for execution by the processor 505 in the form of software to create a digital image file from a captured image. In an exemplary embodiment, the image capturing module 530 may further include a processor or co-processor which assists the processor 505 in processing image data and an encoder and/or decoder for compressing and/or decompressing image data. The encoder and/or decoder may encode and/or decode according to, for example, a joint photographic experts group (JPEG) standard or other format.

The clustering manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the clustering manager 540 as described herein. In an example embodiment, the processor 505 comprises, or controls, the clustering manager 540. The clustering manager 540 may be, partially or wholly, embodied as processors similar to, but separate from processor 505. In this regard, the clustering manager 540 may be in communication with the processor 505. In various example embodiments, the clustering manager 540 may, partially or wholly, reside on differing apparatuses such that some or all of the functionality of the clustering manager 540 may be performed by a first apparatus, and the remainder of the functionality of the clustering manager 540 may be performed by one or more other apparatuses.

Further, the apparatus 500 and the processor 505 may be configured to perform various functionalities via clustering manager 540. In this regard, the clustering manager 540 may be configured to implement the operations described in the various clustering methods described herein. For example, the clustering manager 540 may be configured to implement the operations 100, 110, 120 and 130 of FIG. 1 and the variations of those and related operations described herein. Further, the clustering manager 540 may be configured to implement the operations 200, 210, 220, and 230 of FIG. 2 and the variations of those and related operations, as well as, the operations 400, 410, 420, and 430 of FIG. 4 and the variations to those and related operations.

Referring now to FIG. 6, a more specific example apparatus in accordance with various embodiments is provided. The example apparatus of FIG. 6 is a mobile terminal 10 configured to communicate within a wireless network, such as a cellular communications network. The mobile terminal 10 may be configured to perform the functionality of the mobile terminal 100 or apparatus 500 as described herein. More specifically, the mobile terminal 10 may be caused to perform the functionality described with respect to FIGS. 1-4, via the processor 20. In this regard, according to some example embodiments, the processor 20 may be configured to perform the functionality described with respect to the clustering manager 540. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, display 28 (which may be a touch screen display), and the keypad 30 may be included as parts of a user interface. In some example embodiments, the mobile terminal 10 may include the image capturing module 530.

FIGS. 1, 3, and 4 illustrates flowcharts of example systems, methods, and/or computer program products according to example embodiments. It will be understood that each operation of the flowcharts, and/or combinations of operations in the flowcharts, can be implemented by various means. Means for implementing the operations of the flowcharts, combinations of the operations in the flowchart, or other functionality of example embodiments described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of 1, 3, and 4 and otherwise described herein may be stored on a memory device, such as memory device 510, volatile memory 40, or volatile memory 42, of an example apparatus, such as example apparatus 500 or mobile terminal 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a plurality of input clusters including a first cluster and at least a second cluster, input clusters including at least one feature, wherein features are extracted from an image, and clusters having a medoid, the medoid of a given cluster being a particular feature of the given cluster that, relative to distances between the features within the given cluster, is closest to the most distant feature from that particular feature;
   determining a first medoid for the first cluster and a second medoid for the second cluster;
   determining an inter-cluster distance between the first medoid and the second medoid;
   merging the first cluster with the second cluster to generate a merged cluster in an instance in which the inter-cluster distance is less than a distance threshold;
   receiving a plurality of features derived from a plurality of facial images;
   splitting the plurality of features into two clusters using a clustering algorithm in an instance in which a medoid of the plurality of features is farther than the threshold distance from any feature within plurality of features;
   recursively splitting clusters in two additional clusters using the clustering algorithm in an instance in which a medoid of the respective cluster is farther than the threshold distance from any feature within the respective cluster; and
   including the clusters resulting from the recursive splitting in the plurality of input clusters.

2. The method of claim 1, further comprising:
   including the merged cluster in the plurality of input clusters; and
   repeatedly merging input clusters until all inter-cluster distances between the medoids of the clusters are greater than the distance threshold.

3. The method of claim 1, wherein the method further comprises:
   receiving a set of facial images; and
   for facial images the set:
      detecting a position of a right eye and a position of a left eye,
      determining a eye-to-eye distance between the position of the right eye and the position of the left eye,
      normalizing the face based at least on the eye-to-eye distance, and
      extracting features from the normalized face for inclusion in the plurality of features.

4. The method of claim 1, wherein the merged cluster is associated with facial images of a particular individual.

5. The method of claim 1, wherein determining the inter-cluster distance includes:
   determining a first projection by projecting the first medoid onto a subspace that is derived from orthogonal vectors based on a mirror image of the first medoid;
   determining a second projection by projecting the second medoid onto a subspace that is derived from orthogonal vectors based on a mirror image of the second medoid; and
   determining the inter-cluster distance based on the first projection and the second projection.

6. The method of claim 1 further comprising merging a singleton cluster with the merged cluster in an instance in which a distance between the singleton cluster and the merged cluster is less than the distance threshold.

7. The method of claim 1 further comprising merging a given merged cluster with the merged cluster in an instance in which a distance between the given merged cluster and the merged cluster is less than the distance threshold.

8. An apparatus comprising:
   at least one processor; and
   at least one memory comprising computer program code, the at least one memory and the computer program code configured to, with the at least one processor, cause the apparatus at least to:
   receive a plurality of input clusters including a first cluster and at least a second cluster, input clusters including at least one feature, wherein features are extracted from an image, and clusters having a medoid, the medoid of a given cluster being a particular feature of the given cluster that, relative to distances between the features within the given cluster, is closest to the most distant feature from that particular feature;
   determine a first medoid for the first cluster and a second medoid for the second cluster;
   determine an inter-cluster distance between the first medoid and the second medoid;
   merge the first cluster with the second cluster to generate a merged cluster in an instance in which the inter-cluster distance is less than a distance threshold;

receive a plurality of features derived from a plurality of facial images;
split the plurality of features into two clusters using a clustering algorithm in an instance in which a medoid of the plurality of features is farther than the threshold distance from any feature within plurality of features;
recursively split clusters in two additional clusters using the clustering algorithm in an instance in which a medoid of the respective cluster is farther than the threshold distance from any feature within the respective cluster; and
include the clusters resulting from the recursive splitting in the plurality of input clusters.

9. The apparatus of claim 8, wherein the apparatus is further cause caused to:
include the merged cluster in the plurality of input clusters; and
repeatedly merge input clusters until all inter-cluster distances between the medoids of the input clusters are greater than the distance threshold.

10. The apparatus of claim 8, wherein the apparatus is further caused to:
receive a set of facial images; and
for facial images in the set:
detect a position of a right eye and a position of a left eye, determine a eye-to-eye distance between the position of the right eye and the position of the left eye,
normalize the face based at least on the eye-to-eye distance, and
extract features from the normalized face for inclusion in the plurality of features.

11. The apparatus of claim 8, wherein the merged cluster is associated with facial images of a particular individual.

12. The apparatus of claim 8, wherein the apparatus is further caused to:
determine a first projection by projecting the first medoid onto a subspace that is derived from orthogonal vectors based on a mirror image of the first medoid;
determine a second projection by projecting the second medoid onto a subspace that is derived from orthogonal vectors based on a mirror image of the second medoid; and
determine the inter-cluster distance based on the first projection and the second projection.

13. The apparatus of claim 8, wherein the apparatus is further caused to merge a singleton cluster with the merged cluster in an instance in which a distance between the singleton cluster and the merged cluster is less than the distance threshold.

14. The apparatus of any claim 8, wherein the apparatus is further caused to merge a given merged cluster with the merged cluster in an instance in which a distance between the given merged cluster and the merged cluster is less than the distance threshold.

15. The apparatus of claim 8, wherein the apparatus comprises a mobile device.

16. The apparatus of claim 15, wherein the apparatus comprises a communication device comprising:
a user interface circuitry and user interface software configured to facilitate a user to control at least one function of the communication device through use of a display and further configured to respond to user inputs; and
a display circuitry configured to display at least a portion of a user interface of the communication device, the display and display circuitry configured to facilitate the user to control at least one function of the communication.

17. A computer program product comprising at least one computer readable medium having program code stored thereon, the program code which when executed by an apparatus cause the apparatus at least to:
receive a plurality of input clusters including a first cluster and at least a second cluster, input clusters including at least one feature, wherein features are extracted from an image, and clusters having a medoid, the medoid of a given cluster being a particular feature of the given cluster that, relative to distances between the features within the given cluster, is closest to the most distant feature from that particular feature;
determine a first medoid for the first cluster and a second medoid for the second cluster;
determine an inter-cluster distance between the first medoid and the second medoid;
merge the first cluster with the second cluster to generate a merged cluster in an instance in which the inter-cluster distance is less than a distance threshold;
receive a plurality of features derived from a plurality of facial images;
split the plurality of features into two clusters using a clustering algorithm in an instance in which a medoid of the plurality of features is farther than the threshold distance from any feature within plurality of features;
recursively split clusters in two additional clusters using the clustering algorithm in an instance in which a medoid of the respective cluster is farther than the threshold distance from any feature within the respective cluster; and
include the clusters resulting from the recursive splitting in the plurality of input clusters.

18. The computer program product of claim 17, wherein the computer program code further causes the apparatus to:
include the merged cluster in the plurality of input clusters; and
repeatedly merge input clusters until all inter-cluster distances between the medoids of the input clusters are greater than the distance threshold.

19. The computer program product of claim 17, wherein the computer program code further causes the apparatus to:
receive a set of facial images; and
for facial images in the set:
detect a position of a right eye and a position of a left eye, determine a eye-to-eye distance between the position of the right eye and the position of the left eye,
normalize the face based at least on the eye-to-eye distance, and
extract features from the normalized face for inclusion in the plurality of features.

20. The computer program product of claim 17, wherein the merged cluster is associated with facial images of a particular individual.

21. The computer program product of claim 17, wherein the computer program code that causes the apparatus to determine the inter-cluster distance includes computer program code that causes the apparatus to:
determine a first projection by projecting the first medoid onto a subspace that is derived from orthogonal vectors based on a mirror image of the first medoid;
determine a second projection by projecting the second medoid onto a subspace that is derived from orthogonal vectors based on a mirror image of the second medoid; and
determine the inter-cluster distance based on the first projection and the second projection.

22. The computer program product of claim 17, wherein the computer program code further causes the apparatus to merge a singleton cluster with the merged cluster in an instance in which a distance between the singleton cluster and the merged cluster is less than the distance threshold.

23. The computer program product of claim 17, wherein the computer program code further causes the apparatus to merge a given merged cluster with the merged cluster in an instance in which a distance between the given merged cluster and the merged cluster is less than the distance threshold.

* * * * *

UNITED STATES PATENT AND TRADEMARK OFFICE
CERTIFICATE OF CORRECTION

| | | |
|---|---|---|
| PATENT NO. | : 8,879,803 B2 | Page 1 of 1 |
| APPLICATION NO. | : 13/326255 | |
| DATED | : November 4, 2014 | |
| INVENTOR(S) | : Ukil et al. | |

It is certified that error appears in the above-identified patent and that said Letters Patent is hereby corrected as shown below:

In the Claims

Claim 14, col. 17, line 50 "any" should be deleted.

Signed and Sealed this
Third Day of March, 2015

Michelle K. Lee
*Deputy Director of the United States Patent and Trademark Office*